US009239729B1

(12) United States Patent
Ryan et al.

(10) Patent No.: US 9,239,729 B1
(45) Date of Patent: Jan. 19, 2016

(54) SIDECAR FILE FRAMEWORK FOR MANAGING VIRTUAL DISK PLUG-IN DATA AND METADATA

(71) Applicant: VMware, Inc., Palo Alto, CA (US)

(72) Inventors: Nicholas Michael Ryan, Sunnyvale, CA (US); Nishant Yadav, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/477,692

(22) Filed: Sep. 4, 2014

(51) Int. Cl.
*G06F 9/46* (2006.01)
*G06F 9/455* (2006.01)
*G06F 9/445* (2006.01)

(52) U.S. Cl.
CPC ........ *G06F 9/45533* (2013.01); *G06F 9/44526* (2013.01); *G06F 9/45558* (2013.01); *G06F 2009/45583* (2013.01)

(58) Field of Classification Search
CPC .................................................. G06F 9/45533
USPC ................................................ 718/101–108
See application file for complete search history.

(56) References Cited

U.S. PATENT DOCUMENTS

| | | | | |
|---|---|---|---|---|
| 8,060,683 B2* | 11/2011 | Shultz et al. | .......... | G06F 9/5077 711/118 |
| 2005/0234985 A1* | 10/2005 | Gordon et al. | .... | G06F 17/30781 |
| 2007/0118657 A1* | 5/2007 | Kreitzer et al. | ... | G06F 17/30038 709/227 |
| 2010/0070725 A1* | 3/2010 | Prahlad et al. | ...... | G06F 11/1453 711/162 |
| 2010/0235831 A1* | 9/2010 | Dittmer | ............... | G06F 9/45558 718/1 |
| 2011/0179082 A1* | 7/2011 | Vaghani et al. | ... | G06F 17/30067 707/781 |
| 2012/0167080 A1* | 6/2012 | Vilayannur et al. | .. | G06F 3/0608 718/1 |
| 2013/0152080 A1* | 6/2013 | Sachindran et al. | | G06F 9/44526 718/1 |
| 2013/0332927 A1* | 12/2013 | Tang et al. | .......... | G06F 9/45545 718/1 |
| 2014/0189429 A1* | 7/2014 | Gill et al. | ............ | G06F 11/1446 714/19 |

OTHER PUBLICATIONS

Schmuck, F. B., & Haskin, R. L. (Jan. 2002). GPFS: A Shared-Disk File System for Large Computing Clusters. In FAST (vol. 2, p. 19).*
Figueiredo, R. J., Dinda, P., & Fortes, J. (May 2003). A case for grid computing on virtual machines. In Distributed Computing Systems, 2003. Proceedings. 23rd International Conference on (pp. 550-559). IEEE.*
Sapuntzakis, Constantine P., et al. "Optimizing the migration of virtual computers." ACM SIGOPS Operating Systems Review 36.SI (2002): pp. 377-390.*
File System Minifilter Drivers (Windows Drivers), 2014 Microsoft, downloaded on Sep. 4, 2014 at: http://msdn.microsoft.com/en-us/library/windows/hardware/ff540402(v=vs.85).aspx, 30 pages.

* cited by examiner

*Primary Examiner* — Satish Rampuria

(57) ABSTRACT

Exemplary methods, apparatuses, and systems include receiving selection of a virtual disk and a plug-in. The virtual disk includes an extent file storing data used by a virtual machine and a descriptor file including a reference to the extent file and used by a virtualization stack of a host computer to manage the virtual disk. The plug-in is attached to the virtual disk in response to the received selection. Attaching the plug-in includes adding an identification of the plug-in to the descriptor file. The plug-in is notified of the attachment to the virtual disk. A request is received from the plug-in to create a sidecar file to store data or metadata on behalf of the plug-in. The sidecar file is created for the attached plug-in. The sidecar file is attached to the virtual disk.

17 Claims, 6 Drawing Sheets

SIDECAR FILE FRAMEWORK FOR MANAGING VIRTUAL DISK PLUG-IN DATA AND METADATA

FIELD OF THE INVENTION

The various embodiments described herein relate to managing plug-ins and corresponding sidecar files within a virtualization environment. In particular, embodiments relate to providing a framework for virtual disk input/output (I/O) filters or other plug-ins on host devices. This framework enables the creation and maintenance of sidecar files to store data or metadata for the plug-ins.

BACKGROUND OF THE INVENTION

A virtual disk for a virtual machine (VM) may consist of a collection of files stored on an underlying file system. For example, the virtual disk may contain a metadata file, referred to herein as the "descriptor file," and at least one data file, referred to herein as the "extent file." The extent file stores the virtual disk's data, which is accessible to the VM. The descriptor file contains metadata accessible to the host's core virtualization stack for management of the extent file. For example, the descriptor file points to one or more extent files to indicate which extent files belong to the virtual disk and to provide the layout of a virtual disk. The descriptor and extent files for a virtual disk are migrated, cloned, and otherwise copied together.

Virtual disk I/O filters are plug-ins/pluggable code modules that are able to intercept and, if applicable, modify VM I/O requests directed to corresponding virtual disks owned by the VMs. In doing so, these filters may use and/or create data/metadata that needs to be stored. I/O filter data shouldn't be simply stored in a global location because it must be able to be easily migrated, cloned, and otherwise copied along with the virtual disk. Virtual disk I/O filters, however, may create too much data/metadata to be stored in the descriptor file. For example, a filter may require many megabytes or even gigabytes of storage space (e.g., for caching or storage of hashes), but a typical descriptor file is very small, on the order of a few kilobytes. Ballooning the size of the descriptor file to accommodate I/O filter data would severely impact performance and maintainability of the virtual disk. Additionally, such metadata should not stored in the extent file, which may be limited to the VM's data.

BRIEF DESCRIPTION OF THE DRAWINGS

The present invention is illustrated by way of an example and not limited to the figures and the accompanying drawings, in which like references indicate similar elements, and in which:

FIG. 4 is a flow chart illustrating an exemplary method of utilizing a sidecar file with an input/output filter plug-in;

DETAILED DESCRIPTION

Embodiments described herein provide a sidecar file framework for managing virtual disk plug-in data and metadata. The framework allows for each plug-in to own a sidecar file on a file system associated with the corresponding virtual disk. As described above, a virtual disk includes descriptor and extent files. The sidecar file is separate from the descriptor and extent files and the framework tracks the sidecar file using of an entry in the disk's descriptor file. The framework presents an application programming interface (API) to plug-ins for creating or otherwise accessing sidecar files. The API further allows for discovery, migration, cloning, creating a snapshot, and other management of sidecar files, e.g., in response to the migration, cloning, creating a snapshot, or other management event for a corresponding virtual disk. As a result, plug-ins are presented with a uniform means for creating a sidecar file to store data and/or metadata and the framework automatically applies a virtual disk event to the sidecar file along side the virtual disk.

Figure 1:
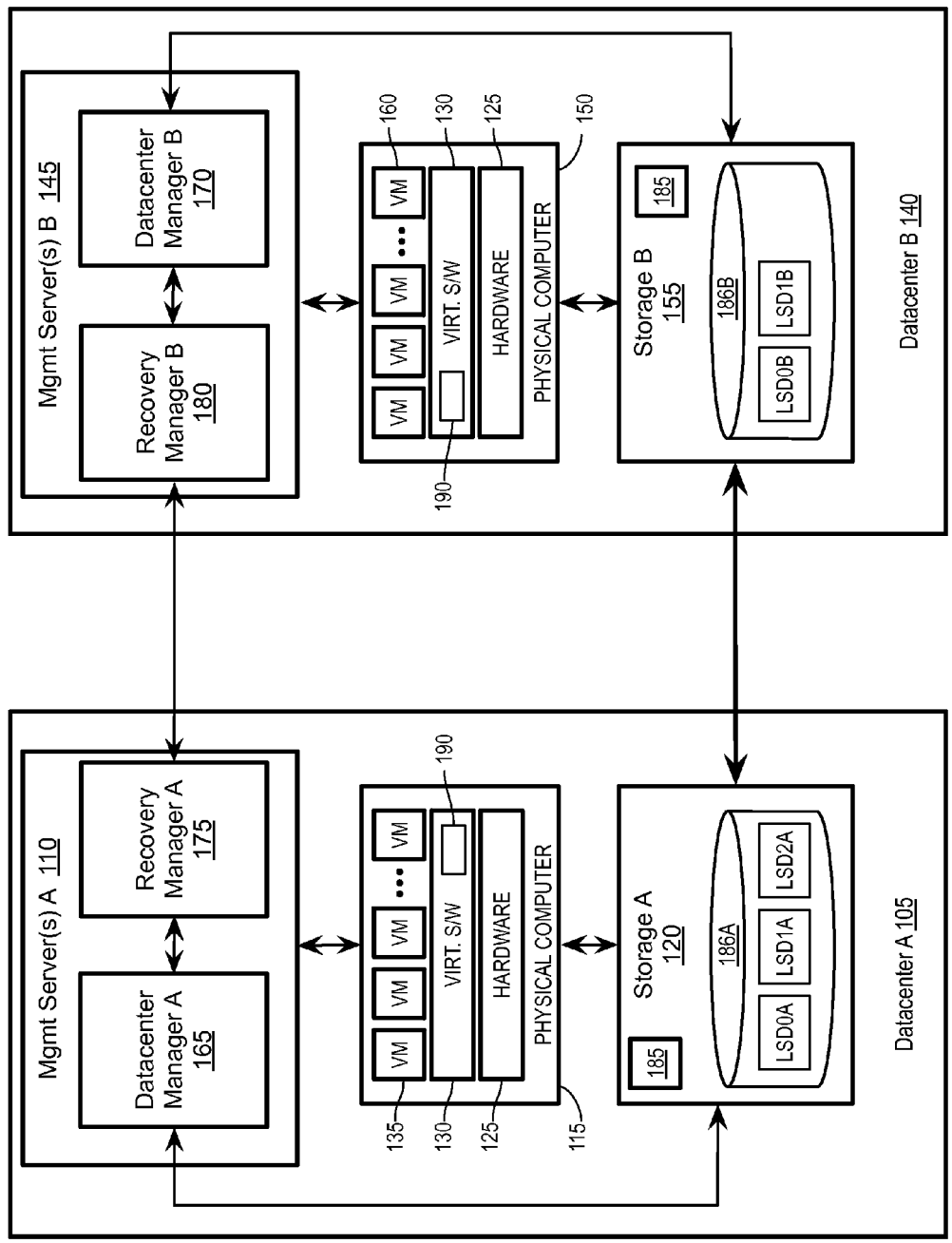
FIG. 1 illustrates, in block diagram form, exemplary virtual datacenters configured to provide a sidecar file framework for managing virtual disk plug-in data and metadata.

FIG. 1 illustrates, in block diagram form, exemplary virtual datacenters configured to provide a sidecar file framework for managing virtual disk plug-in data and metadata. Datacenter A 105 includes management server(s) A 110, one or more host devices 115, and storage A 120. Each host device 115 includes hardware 125, virtualization software layer 130 (also referred to as a hypervisor), and virtual machines (VMs) 135. Similarly, datacenter B 140 includes management server(s) B 145, one or more host devices 150, and storage B 155. Each host device 150 includes hardware 125, virtualization software layer 130, and VMs 160. In one embodiment, datacenter A 105 represents a first datacenter site and datacenter B represents a second, geographically distinct datacenter site.

VMs 135/160 are complete computation environments, containing virtual equivalents of the hardware and system software components of a physical system and are typically implemented by an extensive virtualization infrastructure, which includes a variety of software and hardware components. For example, one or more of the VMs may implement virtual desktops. A virtual desktop is a virtual computing system that operates as a desktop or workstation computer with which an end user can interact using a desktop remoting protocol over a network. In one embodiment, one or more of the VMs implement a virtualized networking, storage, or security service (e.g., a firewall, webserver, database server, etc.).

Virtualization software layer 130 runs on hardware 125 of host device (e.g., a physical computer) 115/150 and manages one or more VMs 135/160. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk for each VM within underlying storage 120/155.

Virtualization software layer 130 includes plug-in and sidecar file framework 190. As described in further detail below, plug-in and sidecar file framework 190 includes one or more modules and/or libraries to enable virtualization software layer 130 to attach plug-ins to virtual disks, load plug-ins, notify plug-ins of events, receive and execute sidecar file commands from plug-ins, and migrate, copy, or otherwise manage sidecar files automatically in response to corresponding virtual disk events.

Each of storage A 120 and storage B 155 includes one or more physical storage devices. In one embodiment, storage A 120 and storage B 155 include storage controllers 185 to serve read and write requests and management commands/queries from host devices 115/150 and management servers 110/145. Each of storage A 120 and storage B 155 is partitioned into logical units, volumes, virtual volumes, and/or disks (which are collectively referred to herein as logical storage devices) that are stored on one or more of the physical storage devices. For example, storage A 120 is illustrated as including logical storage devices LSD0A, LSD1A, and LSD2A within array 186A and storage B 155 is illustrated as including logical storage devices LSD0B and LSD1B within array 186B. Each of storage A 120 and storage B 155 may include additional arrays, logical storage devices, or other partitions of storage. In one embodiment, the logical storage devices LSD0A, LSD1A, and LSD2A store virtual disks corresponding to VMs 135 and logical storage devices LSD0B and LSD1B store virtual disks corresponding to VMs 160.

Management server(s) A 110 includes datacenter manager A 165. In one embodiment, datacenter manager A 165 provides a management console for manual and automated control of host computer(s) 115, VMs 135, and storage A 120. Similarly, datacenter manager B 170 provides a management console for manual and automated control of host computer(s) 150, VMs 160, and storage B 155. For example, datacenter managers 165/170 provision, configure, and maintain VMs as virtual desktops or network services, manage pools of computer resources to run the VMs, etc. Additionally, datacenter managers 165/170 may clone, snapshot, and migrate VMs 135/160 (and their corresponding virtual disks) between host computer(s) 115/150 within a single datacenter or across datacenters 105/140. In one embodiment, datacenter managers 165/170 manage multiple host computers 115/150 within each datacenter 105/140 and/or stretched across both datacenters 105/140.

Management servers 110/145 further include recovery managers 175/180. The recovery managers 175/180 provide administrative access to define protection groups, recovery plans, a preferred recovery type, and other failover policies. In one embodiment, datacenter managers 165/170 are implemented within different management servers 110/145 than recovery managers 175/180. For example, recovery manager 175 may be installed on a separate physical or virtual machine from datacenter manager 165. In an alternate embodiment, one or more recovery managers 175/180 are implemented by the corresponding datacenter manager(s) 165/170.

Components of datacenter A 105 are coupled to components of datacenter B 140. While various components are illustrated as being directly coupled for the ease of explanation (e.g., to illustrate the direction of replicated data), a network including one or more switches or routers may lie between datacenter A 105 and datacenter B 140 and facilitate the coupling of the various components.

Figure 2:
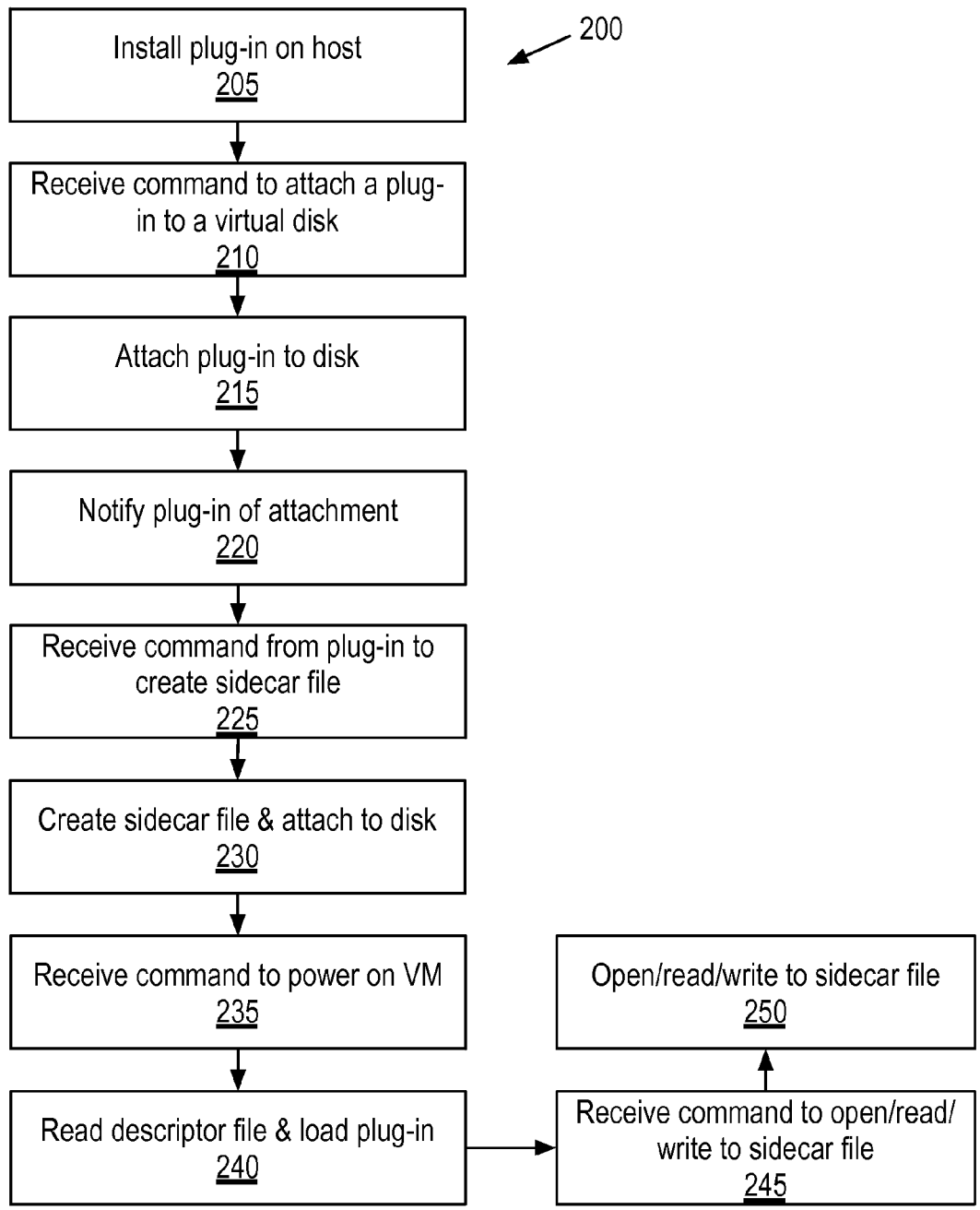
FIG. 2 is a flow chart illustrating an exemplary method of attaching a plug-in and corresponding sidecar to a virtual disk.

FIG. 2 is a flow chart illustrating exemplary method 200 of attaching a plug-in and corresponding sidecar to a virtual disk. At block 205, a host computer installs a plug-in. For example, datacenter manager 167/170 may instruct virtualization software 130 of host computer 115/150 to install an I/O filter or other plug-in in response to corresponding administrator selections. In one embodiment, the installation of a plug-in includes assigning a ranking to the plug-in. For example, multiple filters may be applied to an I/O stream. Ranks assigned to the multiple filters may designate the order in which the filters may be applied to the I/O. In one embodiment, ranks are assigned based upon defined classes and the installation includes assigning a defined class to the plug-in. Exemplary classes include inspection, compression, encryption, replication, and caching.

At block 210, the host computer receives a command to attach a plug-in to a virtual disk. For example, datacenter manager 167/170 may expose installed plug-ins and underlying virtual disks to an administrator. Datacenter manager 167/170 instructs virtualization software 130 of host computer 115/150 to add a plug-in to a virtual disk in response to administrator selection of an installed plug-in and a virtual disk.

At block 215, the host computer attaches the selected plug-in to the selected disk. In one embodiment, attaching a plug-in to a virtual disk includes framework 190 passing a command to underlying storage 120/155 to add an entry in the descriptor file for that virtual disk. The added entry includes an indication of/pointer to the plug-in. For example, the entry may include the name and/or storage location of the plug-in.

At block 220, the host computer notifies the selected plug-in of the attachment to the selected virtual disk. For example, plug-in and sidecar file framework 190 notifies the plug-in via an API or other message passing mechanism that the plug-in has been attached to a virtual disk.

At block 225, the host computer receives a command from the notified plug-in to create a sidecar file. For example, in response to the notification, the plug-in utilizes an API or other message passing mechanism to request that framework 190 create a sidecar file to be used by the plug-in in operations related to the virtual disk. The sidecar file may store configuration parameters/policies on behalf of the plug-in. Additionally, the plug-in may maintain virtual disk data and/or metadata in the sidecar file. In one embodiment, the plug-in stores hash values in the sidecar file to perform integrity checks on the virtual disk. In another embodiment, the plug-in caches virtual disk data in the sidecar file. In yet another embodiment, the plug-in operates as a predictive cache and stores an order of blocks that are subject to consecutive I/O requests. In another embodiment, the plug-in stores one or more encryption keys in the sidecar file.

At block 230, the host computer creates the sidecar file and attaches the sidecar file to the virtual disk. For example, plug-in and sidecar file framework 190 passes a command to underlying storage 120/155 to create the sidecar file. In one embodiment, the sidecar file creation command includes a file size. Once created, framework 190 passes a command to underlying storage 120/155 to add an entry to the descriptor file for the virtual disk. The entry includes a pointer to, indication of, and/or location of the sidecar file. In one embodiment, the sidecar file entry is added as a part of a key value pair including the entry for the attached plug-in.

At block 235, the host computer receives a command to power on a VM dependent upon the virtual disk. For example, a user or administrator may power on the VM. Alternatively, a VM may be automatically powered on, e.g., when the host computer is powered on.

At block 240, the host computer reads the VM's descriptor file while powering on the VM to determine if one or more plug-ins are to be loaded for use with the VM. For example, the descriptor file includes an entry of the attached plug-in (as described above). The host computer reads this entry and loads the corresponding plug-in for use along with the VM and/or the VM's virtual disk.

At block 245, the host computer receives a command from the loaded plug-in to discover, open, read, or write to the sidecar file. For example, the plug-in requests the sidecar file handle, pointer, or other reference from plug-in and sidecar file framework 190 and issues a read or write command using the received handle to maintain or otherwise use the data and/or metadata stored in the sidecar file.

At block 250, the host computer performs the discovery, open, read, or write command. For example, in response to a read command from the plug-in, framework 190 reads the corresponding data/metadata from the sidecar file and returns the data/metadata to the plug-in.

Figure 3:
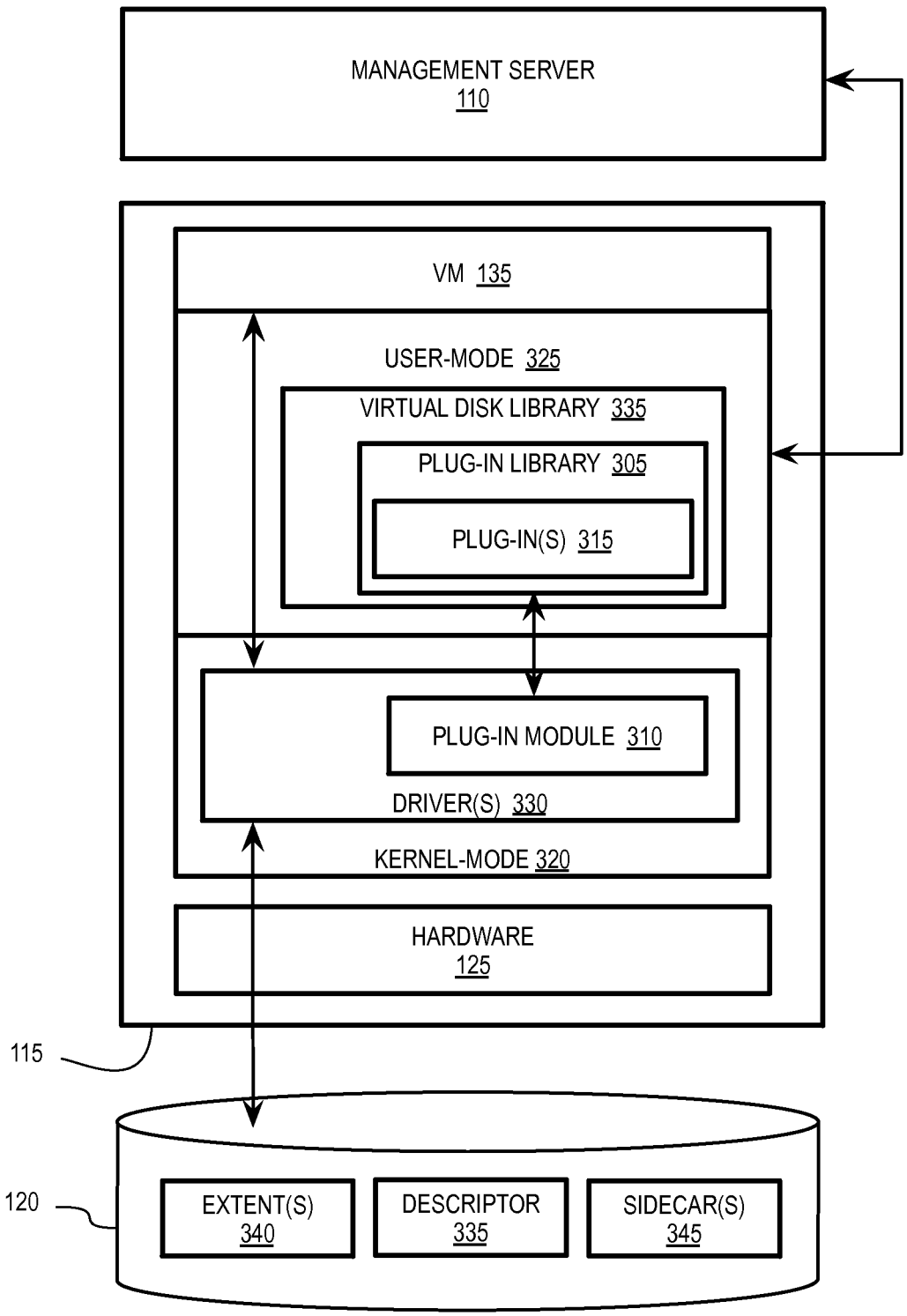
FIG. 3 illustrates, in block diagram form, an exemplary host device configured to provide the sidecar file framework across kernel and user-modes.

FIG. 3 illustrates, in block diagram form, exemplary host device 115 configured to provide an embodiment of plug-in and sidecar file framework 190. Plug-in and sidecar file framework 190 includes virtual disk library 335, plug-in library 305, plug-in module 310, and one or more plug-ins 315. In the illustrated embodiment, plug-in and sidecar file framework 190 is implemented across kernel and user-modes. As used herein, an application, driver, module, etc. running in kernel-mode 320 typically has unrestricted or minimally restricted access to virtual and/or physical resources (e.g., memory and processing resources). In contrast, an application, driver, module, etc. running in user-mode 325 has more restrictions on access to the virtual and/or physical resources (as compared to kernel-mode 320). For example, a host computer may run a driver in user-mode 325 to provide an intervening layer between the driver and the underlying resources. As a result, a poorly written device driver in user-mode 325 cannot crash the system by, e.g., erroneously overwriting kernel memory. Exemplary user-mode restrictions may prevent a plug-in 315 from doing one or more of the following: forking a new process, executing another executable, opening arbitrary files, etc. As a result, third parties that are typically not granted kernel-mode access may implement plug-ins 315 that utilize sidecar files as described herein. In an alternate embodiment, plug-in library 305 and/or plug-in(s) 315 are implemented within kernel-mode 320.

Host device 115 includes one or more drivers 330 that run in kernel-mode 320. For example, drivers 315 may implement a storage management stack for virtualization software 130. I/O commands directed to a virtual disk that are initiated by a VM 135, management server 110, or otherwise from an application, module, plug-in, etc., within user-mode 325 are passed to driver(s) 330 for translation and/or processing. As described above, a virtual disk may include a descriptor file 335 and one or more extent files 340. Descriptor file 335 points to or otherwise identifies the one or more extent files 340 and one or more sidecar files 345.

Virtual disk library 335 is a set of function calls used to manipulate virtual disk files. For example, virtual disk library 335 opens, closes, snapshots, clones, deletes, migrates, and otherwise manages virtual disks (e.g., in response to a command from datacenter manager 165/170 or recovery manager 175/180). In one embodiment, virtual disk library 335 instantiates or otherwise configures plug-in module 310. For example, when virtual disk library 335 opens a virtual disk when powering on a VM, virtual disk library 335 may configure plug-in module 310 to intercept I/O requests directed at the virtual disk. Intercepted I/O requests are passed to corresponding plug-in(s) 315 via plug-in library 305. Additionally, in opening the virtual disk, virtual disk library 335 calls plug-in library 305 to load and initialize one or more plug-in(s) 315 that have been attached to the virtual disk.

Plug-in library 305 is loaded by virtual disk library 335 and manages one or more plug-in(s) 315 in user-mode 325. Plug-in library 305 loads and maintains a list of loaded plug-ins 315 for opened virtual disks. In one embodiment, each plug-in 315 registers a set of callbacks with plug-in library 305. The callbacks pertain to different disk operations and enable plug-ins 315 to react to virtual disk events. For example, as described further herein, plug-in library 305 may notify each plug-in 315 attached to a virtual disk when the virtual disk is migrated, cloned, or otherwise copied or moved to enable plug-in(s) 315 to flush data for consistency. Additionally, plug-in library 305 provides an API for plug-in(s) 315 to create, read, write, and otherwise manage sidecar file(s) 345. These API calls are implemented via plug-in module 310.

Figure 4:
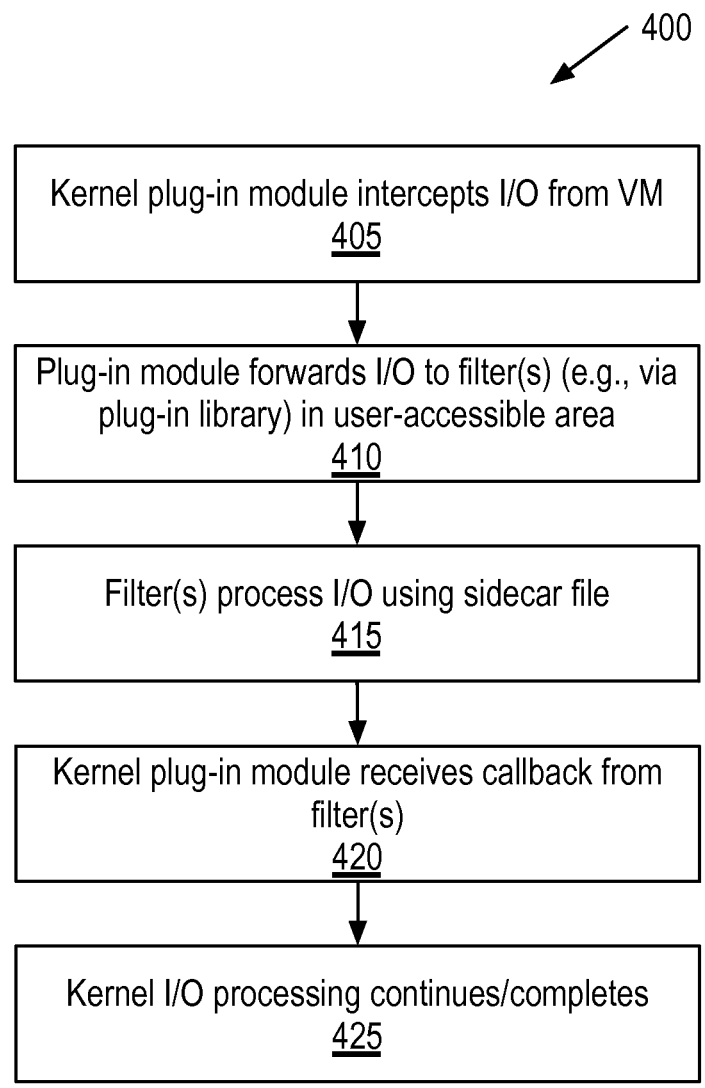

FIG. 4 is a flow chart illustrating exemplary method 400 of utilizing a sidecar file with an I/O filter plug-in. Plug-in and sidecar file framework 190 is a framework for plug-ins and is not limited to I/O filters. Additionally, framework 190 is not limited to spanning kernel and user modes. Method 400, however, will be described with reference to the specific example of a pluggable I/O filter and an embodiment in which plug-in and sidecar file framework 190 is implemented across kernel and user-modes.

At block 405, plug-in module 310 intercepts an I/O request from a VM 135. As described above, virtual disk library 335 instantiates or otherwise configures plug-in module 310 to intercept I/O requests directed to a virtual disk to which an I/O filter 315 has been attached.

At block 410, plug-in module 310 forwards the intercepted I/O request to filter 315 attached to the corresponding virtual disk. For example, plug-in module 310 forwards the intercepted I/O request to plug-in library 305, which passes the intercepted I/O to each plug-in 315 in order of ranking.

At block 415, filter 315 processes the I/O request using the sidecar file 345 attached to the corresponding virtual disk. For example, filter 315 uses a plug-in library 305 API call to read data from or write data to sidecar file 345. As described above, sidecar file 345 may store encryption keys, hash values, cached data, etc.

At block 420, plug-in module 310 receives a callback from filter 315. For example, filter 315 may use a plug-in library 305 API call to abort processing of the I/O request, to return a modified version of the I/O request, to cause processing of the I/O request to continue (e.g., to the virtual disk), etc.

At block 425, the processing of the I/O request continues and/or completes according to the callback. For example, in response to the callback from filter 315, plug-in module 310 may return a modified version of the I/O request to the virtualization stack to complete the request with the underlying virtual disk. Alternatively, plug-in module 310 aborts or continues the processing of the intercepted I/O request in response to the callback from filter 315.

Figure 5:
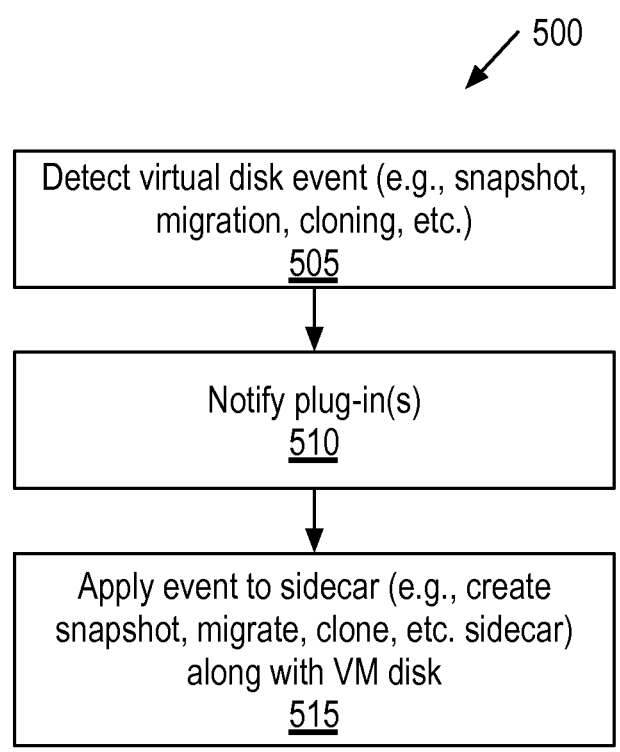
FIG. 5 is a flow chart illustrating an exemplary method of applying a virtual disk event to a sidecar file.

FIG. 5 is a flow chart illustrating exemplary method 500 of applying a virtual disk snapshot, migration, cloning, or other virtual disk event to a sidecar file. At block 505, plug-in and sidecar file framework 190 detects a virtual disk event, such as the initiation of a snapshot, migration, cloning, virtual disk deletion, etc. For example, virtual disk library 335 receives a call to move, copy, or otherwise manipulate a virtual disk. Plug-in library 305 detects or is notified of the received call.

At block 510, plug-in and sidecar file framework 190 notifies one or more plug-in(s) to flush plug-in data or otherwise of the detected virtual disk event. In one embodiment, as described above, each plug-in 315 registers a set of event callbacks with plug-in library 305. When such an event is initiated, plug-in library 305 notifies the corresponding plug-in(s) 315. As a result, each plug-in 315 has an opportunity to flush data or otherwise attempt to make the plug-in's sidecar file 345 consistent prior to moving, copying, or otherwise manipulating the sidecar file 345 along with the virtual disk.

At block 515, plug-in and sidecar file framework 190 applies the event to the sidecar file along with the virtual disk.

For example, in response to an event of cloning a virtual disk (and without a command from the plug-in) plug-in and sidecar file framework 190 automatically reads the descriptor file for the virtual disk, discovers a sidecar file pointer/handle/indicator in the descriptor file, and creates a clone of the discovered sidecar file along with the virtual disk in response to discovering the reference to the sidecar file in the descriptor file. As another example, in response to an event of migration of a virtual disk (and without a command from the plug-in), plug-in and sidecar file framework 190 automatically reads the descriptor file for the virtual disk, discovers a sidecar file pointer/handle/indicator in the descriptor file, and creates a copy of discovered sidecar file within the new storage location in response to discovering the reference to the sidecar file in the descriptor file. The copy of the sidecar file is attached to a mirror driver and able to receive read and write commands from the mirror driver during the process of migration.

Figure 6:
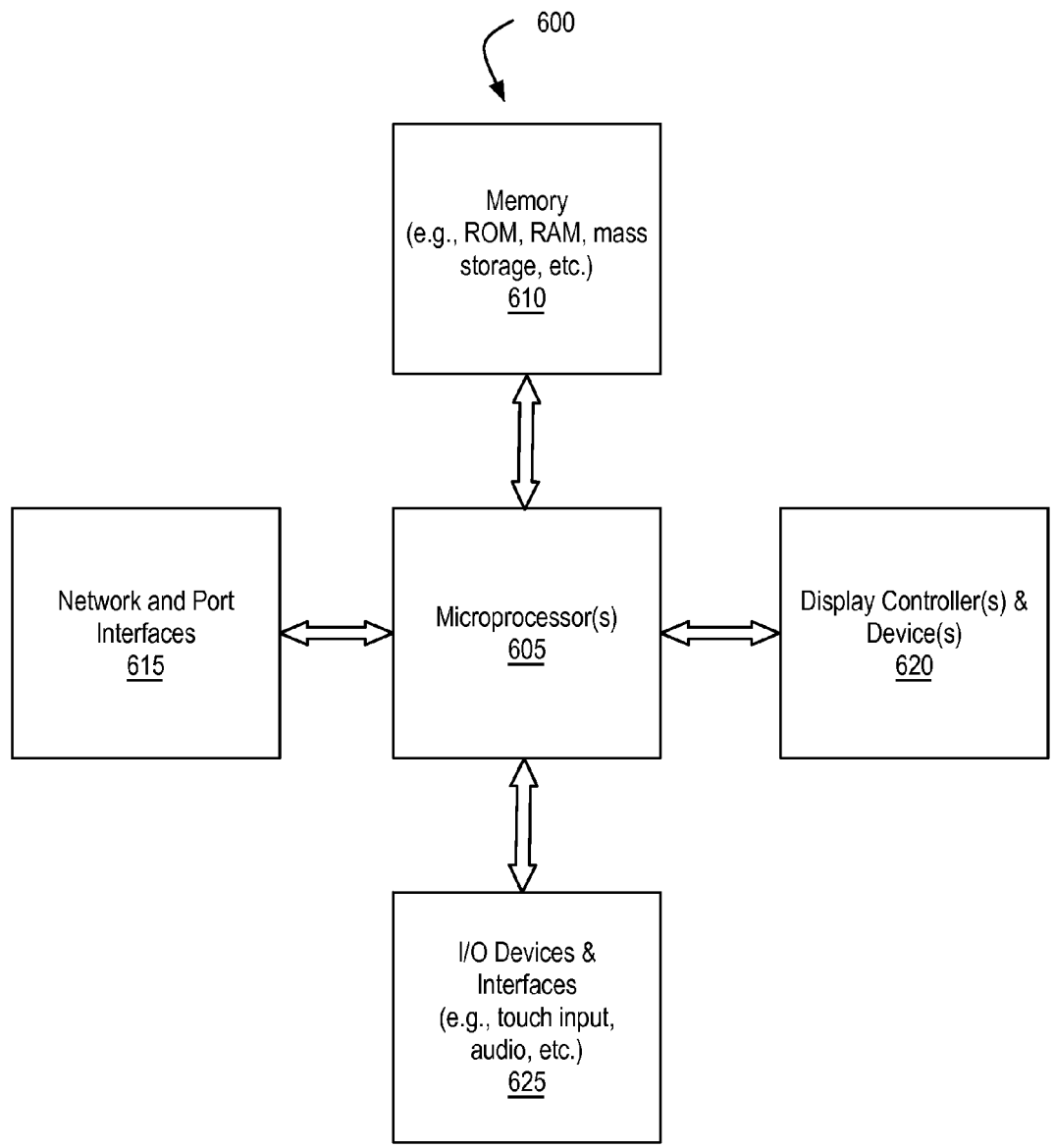
FIG. 6 illustrates, in block diagram form, an exemplary processing system to provide a sidecar file framework for managing virtual disk plug-in data and metadata.

FIG. 6 illustrates, in block diagram form, exemplary processing system 600 provide a sidecar file framework for managing virtual disk plug-in data and metadata. Data processing system 600 includes one or more microprocessors 605 and connected system components (e.g., multiple connected chips). Alternatively, data processing system 600 is a system on a chip.

Data processing system 600 includes memory 610, which is coupled to microprocessor(s) 605. Memory 610 may be used for storing data, metadata, and programs for execution by the microprocessor(s) 605. Memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 610 may be internal or distributed memory.

Data processing system 600 includes network and port interfaces 615, such as a port, connector for a dock, or a connector for a USB interface, FireWire, Thunderbolt, Ethernet, Fibre Channel, etc. to connect the system 600 with another device, external component, or a network. Exemplary network and port interfaces 615 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 600 with another device, external component, or a network and receive stored instructions, data, tokens, etc.

Data processing system 600 also includes display controller and display device 620 and one or more input or output ("I/O") devices and interfaces 625. Display controller and display device 620 provides a visual user interface for the user. I/O devices 625 allow a user to provide input to, receive output from, and otherwise transfer data to and from the system. I/O devices 625 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 6.

Data processing system 600 is an exemplary representation of one or more of management server(s) A 110, host device(s) 115, storage A 120, management server(s) B 145, host device(s) 150, and storage B 155 described above. Data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 600 may be a network computer, server, or an embedded processing device within another device or consumer electronic product. As used herein, the terms computer, device, system, processing system, processing device, and "apparatus comprising a processing device" may be used interchangeably with data processing system 600 and include the above-listed exemplary embodiments.

It will be appreciated that additional components, not shown, may also be part of data processing system 600, and, in certain embodiments, fewer components than that shown in FIG. 6 may also be used in data processing system 600. It will be apparent from this description that aspects of the inventions may be embodied, at least in part, in software. That is, the computer-implemented methods 200, 400, and 500 may be carried out in a computer system or other data processing system 600 in response to its processor or processing system 605 executing sequences of instructions contained in a memory, such as memory 610 or other non-transitory machine-readable storage medium. The software may further be transmitted or received over a network (not shown) via network interface device 615. In various embodiments, hardwired circuitry may be used in combination with the software instructions to implement the present embodiments. Thus, the techniques are not limited to any specific combination of hardware circuitry and software, or to any particular source for the instructions executed by data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used herein, the term "exemplary" refers to embodiments that serve as simply an example or illustration. The use of exemplary should not be construed as an indication of preferred examples. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
receiving selection of a virtual disk and a plug-in to be attached to the virtual disk, wherein the virtual disk includes an extent file storing data used by a virtual machine and a descriptor file including a reference to the extent file and used by a virtualization stack of a host computer to manage the virtual disk;
attaching the plug-in to the virtual disk in response to the received selection, wherein attaching the plug-in includes adding an identification of the plug-in to the descriptor file;
notifying the plug-in of the attachment to the virtual disk;
receiving a request from the plug-in to create a sidecar file to store data or metadata on behalf of the plug-in; and
creating the sidecar file for the attached plug-in;
attaching the sidecar file to the virtual disk
determining that the virtual disk is to be migrated to another host computer, the migration including migrating the descriptor file and the extent file to the other host computer;
discovering the reference to the sidecar file in the descriptor file in response to determining that the virtual disk is to be migrated; and
migrating the sidecar file along with the descriptor file and the extent file to the other host computer in response to discovering the reference to the sidecar file in the descriptor file.

2. The computer-implemented method of claim 1, wherein attaching the sidecar file includes adding a reference to the sidecar file to the descriptor file.

3. The computer-implemented method of claim 1, further comprising:
receiving a command from the plug-in to open the sidecar file, read the sidecar file, or write to the sidecar file; and
performing the command upon the sidecar file.

4. The computer-implemented method of claim 1, further comprising:
notifying the plug-in to ensure the sidecar file is consistent prior to the migration.

5. The computer-implemented method of claim 1, wherein migrating the sidecar includes attaching a copy of the sidecar file to a mirror driver, the copy of the sidecar file receiving read and write commands from the mirror driver during migration.

6. The computer-implemented method of claim 1, further comprising:
determining that the virtual disk is to be copied in response to a snapshot or clone command, the copying of the virtual disk including creating a copy of the descriptor file and a copy of the extent file;
discovering the reference to the sidecar file in the descriptor file in response to determining that the virtual disk is to be copied; and
creating a copy of the sidecar file along with the descriptor file and the extent file in response to discovering the reference to the sidecar file in the descriptor file.

7. A non-transitory computer-readable medium storing instructions, which when executed by a processing device, cause the processing device to perform a method comprising:
receiving selection of a virtual disk and a plug-in to be attached to the virtual disk, wherein the virtual disk includes an extent file storing data used by a virtual machine and a descriptor file including a reference to the extent file and used by a virtualization stack of a host computer to manage the virtual disk;
attaching the plug-in to the virtual disk in response to the received selection, wherein attaching the plug-in includes adding an identification of the plug-in to the descriptor file;
notifying the plug-in of the attachment to the virtual disk;
receiving a request from the plug-in to create a sidecar file to store data or metadata on behalf of the plug-in; and
creating the sidecar file for the attached plug-in;
attaching the sidecar file to the virtual disk
determining that the virtual disk is to be migrated to another host computer, the migration including migrating the descriptor file and the extent file to the other host computer;
discovering the reference to the sidecar file in the descriptor file in response to determining that the virtual disk is to be migrated; and
migrating the sidecar file along with the descriptor file and the extent file to the other host computer in response to discovering the reference to the sidecar file in the descriptor file.

8. The non-transitory computer-readable medium of claim 7, wherein attaching the sidecar file includes adding a reference to the sidecar file to the descriptor file.

9. The non-transitory computer-readable medium of claim 7, the method further comprising:
receiving a command from the plug-in to open the sidecar file, read the sidecar file, or write to the sidecar file; and
performing the command upon the sidecar file.

10. The non-transitory computer-readable medium of claim 7, the method further comprising:
notifying the plug-in to ensure the sidecar file is consistent prior to the migration.

11. The non-transitory computer-readable medium of claim 7, wherein
migrating the sidecar includes attaching a copy of the sidecar file to a mirror driver, the copy of the sidecar file receiving read and write commands from the mirror driver during migration.

12. The non-transitory computer-readable medium of claim 7, the method further comprising:
determining that the virtual disk is to be copied in response to a snapshot or clone command, the copying of the virtual disk including creating a copy of the descriptor file and a copy of the extent file;

discovering the reference to the sidecar file in the descriptor file in response to determining that the virtual disk is to be copied; and creating a copy of the sidecar file along with the descriptor file and the extent file in response to discovering the reference to the sidecar file in the descriptor file.

13. An apparatus comprising:

a processing device; and a memory coupled to the processing device, the memory storing instructions which, when executed by the processing device, cause the apparatus to:

receive selection of a virtual disk and a plug-in to be attached to the virtual disk, wherein the virtual disk includes an extent file storing data used by a virtual machine and a descriptor file including a reference to the extent file and used by a virtualization stack of a host computer to manage the virtual disk;

attach the plug-in to the virtual disk in response to the received selection, wherein attaching the plug-in includes adding an identification of the plug-in to the descriptor file;

notify the plug-in of the attachment to the virtual disk;

receive a request from the plug-in to create a sidecar file to store data or metadata on behalf of the plug-in; and create the sidecar file for the attached plug-in;

attach the sidecar file to the virtual disk determine that the virtual disk is to be migrated to another host computer, the migration including migrating the descriptor file and the extent file to the other host computer;

discover the reference to the sidecar file in the descriptor file in response to determining that the virtual disk is to be migrated; and migrate the sidecar file along with the descriptor file and the extent file to the other host computer in response to discovering the reference to the sidecar file in the descriptor file.

14. The apparatus of claim 13, wherein attaching the sidecar file includes adding a reference to the sidecar file to the descriptor file.

15. The apparatus of claim 13, wherein the instructions further cause the apparatus to:

notify the plug-in to ensure the sidecar file is consistent prior to the migration.

16. The apparatus of claim 13, wherein migrating the sidecar includes attaching a copy of the sidecar file to a mirror driver, the copy of the sidecar file receiving read and write commands from the mirror driver during migration.

17. The apparatus of claim 13, wherein the instructions further cause the apparatus to:

determine that the virtual disk is to be copied in response to a snapshot or clone command, the copying of the virtual disk including creating a copy of the descriptor file and a copy of the extent file;

discover the reference to the sidecar file in the descriptor file in response to determining that the virtual disk is to be copied; and create a copy of the sidecar file along with the descriptor file and the extent file in response to discovering the reference to the sidecar file in the descriptor file.

\* \* \* \* \*